United States Patent
Beukema et al.

(10) Patent No.: US 6,754,753 B2
(45) Date of Patent: Jun. 22, 2004

(54) ATOMIC OWNERSHIP CHANGE OPERATION FOR INPUT/OUTPUT (I/O) BRIDGE DEVICE IN CLUSTERED COMPUTER SYSTEM

(75) Inventors: Bruce Leroy Beukema, Hayfield, MN (US); Richard Charles Booth, San Jose, CA (US); David Robert Engebretsen, Cannon Falls, MN (US); Thomas Rembert Sand, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 09/844,584

(22) Filed: Apr. 27, 2001

(65) Prior Publication Data

US 2002/0161955 A1 Oct. 31, 2002

(51) Int. Cl.⁷ .............................................. G06F 15/16
(52) U.S. Cl. ....................... 710/200; 709/216
(58) Field of Search .............................. 710/110, 309, 710/200, 220, 240–244; 709/216, 213, 212

(56) References Cited

U.S. PATENT DOCUMENTS

| 5,548,780 | A | * | 8/1996 | Krein ............................. 710/5 |
| 5,572,734 | A | * | 11/1996 | Narad et al. ................. 710/200 |
| 6,385,657 | B1 | * | 5/2002 | Parady ........................ 709/251 |
| 6,446,149 | B1 | * | 9/2002 | Moriarty et al. ............ 710/110 |
| 6,529,932 | B1 | * | 3/2003 | Dadiomov et al. .......... 709/101 |

* cited by examiner

Primary Examiner—Tim Vo
(74) Attorney, Agent, or Firm—Wood, Herron & Evans, LLP

(57) ABSTRACT

A clustered computer system, bridge device and method include support for an atomic ownership change operation that ensures orderly and reliable ownership management of an input/output (I/O) bridge device. A lock indicator is associated with a bridge device, and is used to indicate a "locked" or "unlocked" status of the bridge device. Whenever the lock indicator indicates that the bridge device is unlocked, an atomic operation such as a read request to a lock indicator register is utilized to both set the indicator to indicate a locked status for the bridge device, and to associate the bridge device with a source node that initiated the atomic operation. In connection with the lock indicator, write access to one or more configuration parameter registers is controlled such that only the node that is associated with the bridge device is permitted to update such configuration parameter registers.

31 Claims, 2 Drawing Sheets

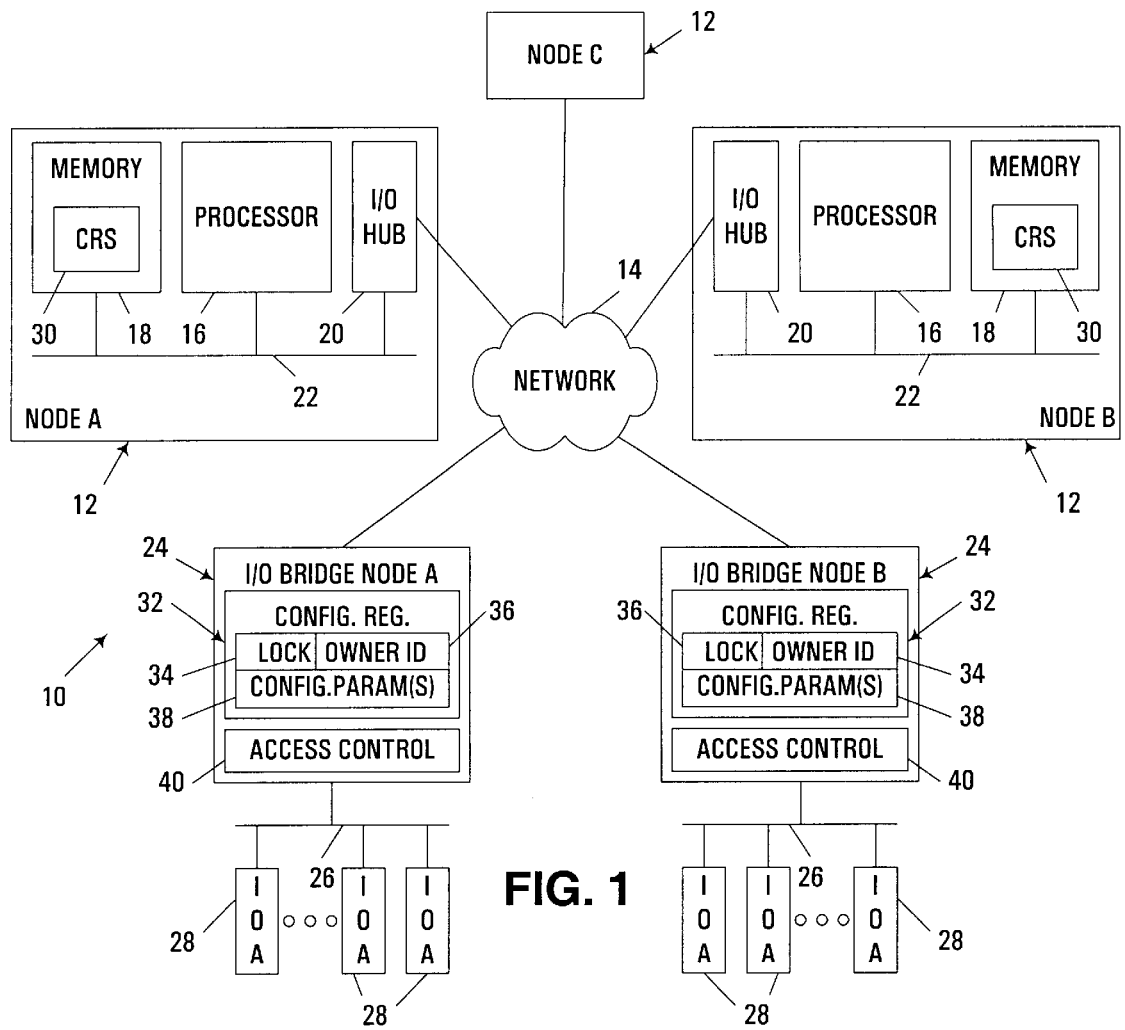
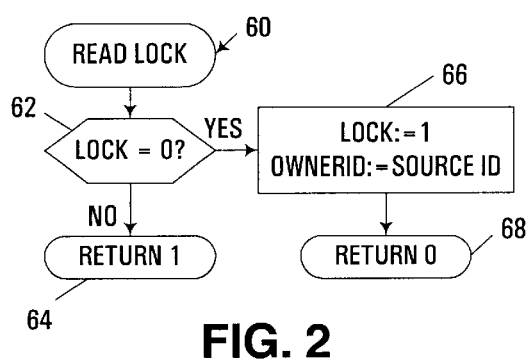
FIG. 2
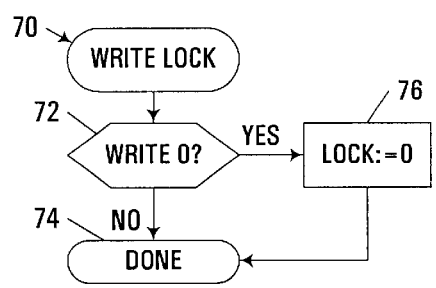
FIG. 3

ATOMIC OWNERSHIP CHANGE OPERATION FOR INPUT/OUTPUT (I/O) BRIDGE DEVICE IN CLUSTERED COMPUTER SYSTEM

FIELD OF THE INVENTION

The invention is generally directed to clustered computer systems, and in particular, to managing ownership of I/O bridge devices therein.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

A clustered computer system, like many other types of computer systems, often requires external communication with various resources, referred to hereinafter as "Input/Output" (I/O) resources, e.g., workstations, network adaptors, storage controllers, etc. In many such systems, I/O resources are coupled to a clustered computer system using one or more I/O bridge devices, which serve the function of "bridging" between two network fabrics, e.g., an I/O expansion bus and a peripheral bus such as a Peripheral Component Interconnect (PCI) bus. I/O bridge devices may be mounted within the same physical enclosure as a node in a clustered computer system, or may be disposed in a separate housing altogether.

In many clustered computer systems, bridge devices are configurable and required to be managed by one of the nodes. Often, it is a requirement that each bridge device be managed by exactly one node at any given point in time. As such, failure of a node in a clustered computer system may result in the loss of communication with any bridge devices owned by that node.

Given the desirability of maximizing availability in clustered computer systems, it is often desirable to maintain availability to all bridge devices and resources thereunder,— even in the event of node failures. As such, it would be highly desirable to facilitate the change of ownership of a bridge device from a failing node to another node that is still functioning. The functioning node could then assume management of the bridge device and allow access to those resources under the bridge device.

Switching ownership of a bridge device is not, however, a trivial process when multiple independent nodes are actively participating in clustering operations. A bridge device typically must be managed by only one node at any point in time due to the fact that certain facilities in the bridge device, e.g, the bridge network address, the address mapping of register space in the bridge device, the address mapping of resources under the bridge device and the power management of the bridge device, must be specifically configured to work with the owning node. However, the proper operation of a bridge device may be compromised when its ownership is being transferred from one node to another if an original owner attempts to access the bridge device during the ownership change. In a clustered computer system, this is typically a significant concern because it is difficult, if not impossible, for an independent node to tell if another node has completely failed or is just responding slowly. Further, if a failed node recovers, a risk exists that the recovered node may attempt to manage bridge devices it owned prior to the failure, but which were switched to a new owner at the time of the failure. Doing so could corrupt the bridge device and cause a partial or complete system failure.

Therefore, a need exists in the art for a manner of changing ownership of a bridge device in a clustered computer system, in particular, to permit reliable and efficient changeover of ownership with minimal interruption in system availability.

SUMMARY OF THE INVENTION

The invention addresses these and other problems associated with the prior art by providing a clustered computer system, bridge device and method including support for an atomic ownership change operation that ensures orderly and reliable ownership management of an Input/Output (I/O) bridge device. In particular, a lock indicator is associated with a bridge device, and is used to ensure that only one node is capable of claiming ownership of the bridge device at a time. Moreover, the ability to set one or more configuration parameters for the bridge device is restricted only to a node having ownership of the bridge device, so that an orderly change in ownership can be performed.

In the illustrated embodiments, a lock indicator is utilized to indicate a "locked" or "unlocked" status of the bridge device. Whenever the lock indicator register indicates that the bridge device is unlocked, an atomic operation such as an access request to a lock indicator register may be utilized to both set the indicator to indicate a locked status for the bridge device, and to associate the bridge device with a source node that initiated the atomic operation. Moreover, in connection with the lock indicator, write access to one or more configuration parameter registers may be controlled such that only that node that is associated with the bridge device is permitted to update such configuration parameter registers.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a clustered computer system consistent with the invention, incorporating I/O bridge devices to interface cluster nodes with I/O resources.

FIG. 2 is a flowchart illustrating the program flow of a read lock routine executed by the access control circuitry for a bridge device from the clustered computer system of FIG. 1.

FIG. 3 is a flowchart illustrating the program flow of a write lock routine executed by the access control circuitry for a bridge device from the clustered computer system of FIG. 1.

DETAILED DESCRIPTION

Figure 4:
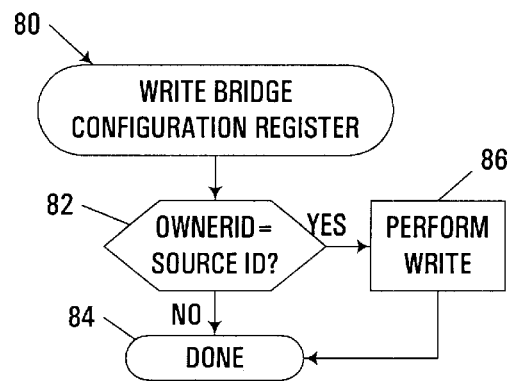
FIG. 4 is a flowchart illustrating the program flow of a write bridge configuration register routine executed by the access control circuitry for a bridge device from the clustered computer system of FIG. 1.

The embodiments described hereinafter generally utilize an atomic test and set operation to reliably and efficiently change ownership of a bridge device in a clustered computer system. Consistent with the invention, a lock indicator is used to ensure that only one node is capable of claiming ownership of the bridge device at a time. Whenever an access request (e.g., a read request) is directed to that lock indicator by a node, the access request is processed as a test and set operation to first, test the status of the lock indicator, and, if the indicator indicates an "unlocked" status for the bridge device, to second, associate the bridge device with that node and set the lock indicator to indicate a locked status for the bridge device. By implementing these functions in an atomic primitive, the change of ownership may occur without conflicts with other nodes, even should a failing node later restart and attempt to manage a bridge device that the node previously managed.

An atomic operation may include activities that are performed in parallel or in serial, so long as the steps in an atomic operation are completed prior to any subsequent operations from the perspective of the bridge device. Put another way, no intervening operations are typically permitted between any of the steps in an atomic operation.

In the context of the invention, a bridge device may represent any networking hardware utilized to interface one or more nodes of a clustered computer system with a set of input/output (I/O) resources. A node is typically considered to "own" a bridge device when the node is permitted to manage the operation of the bridge device, particularly in clustered computer systems where ownership of a bridge device is limited to a single node at a time. Management of a bridge device in the illustrated embodiment typically encompasses at least the ability to update one or more configuration parameters associated with the bridge device. As such, write access to one or more configuration parameter registers on a bridge device is typically restricted to accesses initiated by an owning node.

A bridge device is typically associated with a node by virtue of storing identification information pertaining to an owning node in the bridge device. In the illustrated embodiment, the ownership information is typically used to gate write accesses to one or more configuration parameters for the bridge device. Various ownership identification information may be used, e.g., owner node network address information, port information, serial number, type, model, etc. For example, in the illustrated embodiment, the combination of an IP address associated with the owning node, coupled with a port number through which the node is coupled to the bridge device, is used to identify the owner node. Other information that is capable of uniquely identifying an owning node may be used in the alternative.

As will become more apparent below, any number of network topologies and fabrics may be used to interconnect cluster nodes with a bridge device, whereby bridge devices that are interconnected with and capable of being "owned" by multiple nodes can be effectively managed by any of such nodes regardless of whether such bridge devices are local or remote with respect to the managing nodes.

The lock indicator described above is utilized to gate updates to the ownership information stored for the bridge device. As discussed above, that ownership information, in turn, is utilized to gate updates to the configuration parameters for the bridge device that control how the bridge device operates, in particular, with respect to how the bridge device routes communications from an I/O resource to the clustered computer system. In the illustrated embodiment, read access to configuration parameters may not be gated, although in other embodiments, read access may similarly be gated by the ownership information if desired.

Typically, the lock indicator may be reset using a separate access request such as a write request, so that the bridge device assumes an unlocked status, and so that a subsequent access request may be issued to effect an ownership change operation. Moreover, typically a result is returned in response to an access request so that a node can detect when ownership has been obtained, and so that the node can subsequently reconfigure the now-owned bridge device to interact properly with the owning node.

Other modifications and alternatives will become more apparent below.

Now turning to the Drawings, wherein like numbers denote like parts throughout the several views, FIG. 1 illustrates a clustered computer system 10 that may include a plurality of nodes 12 interconnected with one another via a network of interconnections 14. Each node 12 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like). Moreover, multiple nodes may reside within a single physical computer, e.g., in a logically-partitioned system.

Each node 12 generally includes one or more system processors 16 coupled to a memory or main storage 18 and a input/output (I/O) hub 20 over a processor bus 22. While memory 18 is illustrated as a main memory, it should be appreciated that a multi-level memory architecture is typically used, whereby one or more levels of cache memory are incorporated in the processors and/or external caches (not shown in FIG. 1).

To provide support for various input/output (I/O) resources, one or more I/O bridge devices 24 are also interconnected via network 14 to nodes 12. Each bridge device interfaces the nodes on network 14 with one or more I/O resources coupled to the bridge device via a secondary network 26, e.g,. a plurality of I/O adaptors (IOA's) 28. IOA's 28 may represent, for example, the interface circuitry suitable for interfacing the clustered computer system with various devices such as storage devices and controllers, workstations and workstation controllers, network interfaces, etc.

Any number of network topologies commonly utilized in clustered computer systems may be used to implement each of networks 14 and 26 consistent with the invention. In the illustrated embodiment, for example, each node 12 is an AS/400 or eSeries iServer midrange computer system available from International Business Machines Corporation, with network 14 representing an I/O expansion bus to which each node 12 and bridge device 24 is coupled. Moreover, each bridge device may represent, for example, a Peripheral Component Interconnect (PCI) bridge, whereby network 26 is a PCI bus, the use and configuration of which is well known in the art. Other interconnection fabrics may be utilized to coupled nodes 12 and bridge devices 24 to one another consistent with the invention.

Moreover, it will be appreciated that individual nodes 12 may be physically located in close proximity with other nodes, or may be geographically separated from other nodes, e.g., over a Wide Area Network (WAN), as is well known in the art. In the illustrated embodiment, for example, network 14 may be a peer-to-peer network, with point-to-point interconnections utilized between nodes. Furthermore, bridge devices 24 may be housed within the same physical enclosure as a node 12, or may be disposed locally or remotely with respect to any other node. Therefore, it will be appreciated that the invention is not limited to the particular hardware and interconnection technologies disclosed herein.

To implement the herein-described ownership change functionality, each node in a cluster typically includes a clustering infrastructure to manage the clustering-related operations on the node. For example, node 12 is illustrated as having resident in memory 18 a cluster infrastructure referred to as clustering resource services 30. It is typically through the clustering resource services, or via initiation by a function call from a higher level job or application, that an ownership change operation is initiated by a node. Also typically, the initiation of an ownership change operation is by a node other than a failing node, e.g., in response to a detected error by another node, or by manual request by an administrator via another node.

Each bridge device 24 also typically includes hardware circuitry to handle an ownership change operation in response to a node request. In the illustrated embodiment, an access control circuit 40 is utilized to handle access requests (typically read and write requests) directed to the bridge device. Moreover, in the illustrated embodiment, the bridge device interfaces with a memory mapped I/O interface (e.g., a PCI bus), whereby a portion of the addressable memory space is allocated to various configuration registers 32 defined within the bridge device.

Among other configuration registers that are used to interface with the bridge device, a lock indicator register 34 is provided to store a lock indicator that indicates a "locked" or "unlocked" status for the bridge device. In addition, an owner identifier register 36 is provided to store an owner identifier that indicates which node currently "owns" the bridge device. Additional configuration parameter register (s) 38 are also provided to store one or more configuration parameters that control how the bridge device operates, e.g., how the bridge device routes data to and from network 26, in particular how the bridge device routes requested data to the node 12 currently registered as the owner of the bridge device. Configuration parameters may be defined, for example, for host (owner) system network addressing information, bridge network addressing information, bridge register address mapping information, resource address mapping information, power management information, etc. Other configurable registers may also be incorporated into each bridge device 24, and moreover, some registers may not be configurable by a node in the same manner as other registers as described herein.

It will be appreciated that the functionality described herein may be implemented in various alternate combinations of hardware and/or software in each of nodes 12 and bridge devices 24, and that the functionality may be allocated among other programs, computers or components in clustered computer system 10. Moreover, in the illustrated embodiment, typically the access control circuitry and the access processing functionality implemented thereby is embodied in hardware circuitry (e.g., with hardware state machines), although a programmable controller could be used in the alternative. Nonetheless, despite the hardware-based implementation, the term "routine" will be used to describe the hardware-based functionality implemented in the access control circuit. Therefore, the invention is not limited to the specific hardware and software implementation described herein.

The discussion hereinafter will focus on the specific routines and circuitry utilized to implement the above-described ownership change functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Furthermore, it will be appreciated that some or all of the functionality described herein may be implemented directly in hardware circuitry.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

To support the above-described ownership change functionality, access control circuit 40 is configured to accept read and write accesses directed to the bridge device by various nodes in the clustered computer system. It is assumed for the purpose of this embodiment that the network fabric transports read and write requests between nodes and bridge devices, where each request includes at least the network address of the source of the request, the address of the target of the request, and the memory address being accessed. However, it will be appreciated that other network protocols may be used in the alternative.

In the illustrated embodiment, the access control circuit is configured to process read and write requests directed to the various configuration registers 32 present on the device. Each configuration register is allocated an address in the addressable memory space for the bridge device. Thus, a read or write request directed to the address for a particular configuration register will be processed as a read or write request on that register by the access control circuit for the bridge device.

To implement the above-described ownership change functionality, the access control circuit is configured to process read and write access requests on the lock indicator register in the manner illustrated in FIGS. 2 and 3. The lock indicator register typically stores a "locked" or "unlocked" status for the bridge device and as such, as little as one bit may be used to represent the device status.

As shown in FIG. 2, for example, a read access request directed to the lock indicator register is processed by a read lock routine 60 that begins in block 62 by testing the current state of the lock indicator register. If the lock indicator is set to "1", indicating that the bridge device is currently locked, control passes to block 64 to return a "1" result, indicating that the bridge device is currently locked.

Returning to block 62, if the lock indicator register indicates that the bridge device is unlocked (a value of "0" in the illustrated embodiment), control instead passes to block 66 to (1) lock the bridge device by setting the lock indicator register to a value of "1", and (2) store the identification information for the source node that issued the read request in the owner identifier register. As discussed above, in the illustrated embodiment, the network address of the source node, as well as the port on the bridge from which the read request was received, are typically stored to identify a new owner of the bridge device. By storing the source node information in the owner identifier register, the bridge device is associated with, or owned by the source node. It should be noted that, by using both the network address and port as the owner identifier, it is possible to prevent write access to a bridge device even if multiple nodes on a network have the same network address. Such a situation could occur after a system fails if it is assigned a default network address when it powers up that might not be unique on the network.

Upon completion of block 66, control passes to block 68 to return a value of "0", indicating that the bridge device was unlocked as of the read access request. The "0" result thus indicates to the source node that ownership has been granted to the source node.

A write access request directed to the lock indicator register is processed as shown by routine 70 of FIG. 3. In response to a write request, it is determined in block 72 whether the value to be written to the register is a "0" or "1". If not, control passes to block 74, as no action is performed. However, if a write "0" action is attempted, block 72 passes control to block 76 to reset the lock indicator to a value of "0". Control then passes to block 74 to complete processing of the request. In other embodiments, any write request (e.g., a write of any value) may be processed so as to reset the lock indicator. In such alternate embodiments, no check as to the value supplied in the write request would be required.

To ensure a reliable ownership change, the access control circuit is configured to guarantee that exactly one reader of the lock bit finds it reset, even if two simultaneous reads occur. Any number of known arbitration schemes may be utilized to process one of multiple pending requests, so that only one node will obtain ownership of the bridge device when the bridge device is in an unlocked status. If another node wishes to subsequently retake ownership of the bridge device, that node would be required to reset the lock indicator using a write access request as described above.

Once a bridge device has been locked and associated with a particular node, the lock indicator and owner identifier registers are used to gate read and/or write accesses to the bridge device. In the illustrated embodiment, reads to all bridge registers are permitted at any time, regardless of the status of the lock indicator. However, writes to all registers, with the exception of the lock indicator register, are restricted to the node identified in the owner identifier register. As shown in FIG. 4, for example, a routine 80 may be implemented in the access control circuit to handle write access requests for any bridge configuration register. Routine 80 begins in block 82 by determining whether the source identification information associated with the request is stored in the owner identifier register. If not, control passes to block 84, and the write request is ignored (or a "denied" result is returned). Otherwise, if the information matches, block 82 passes control to block 86 to perform the write operation pursuant to the request. Control then passes to block 84 to complete the operation.

In the illustrated embodiment, it should also be appreciated that write access to the lock indicator register may be permitted at any time, regardless of the state of the lock indicator register. As such, any node is permitted to break a lock on a bridge device if desired. Doing so permits another node to gain ownership even if an owning node does not or cannot relinquish ownership itself, so a failure in the owning node will typically not prevent another node from acquiring ownership of a bridge device.

Initiation of an ownership change consistent with the invention may be handled in a number of manners. For example, it may be desirable to permit the clustering resource services of a node to initiate an ownership change automatically in response to detection of a failure in a particular node, so that a failing node may be relieved of ownership obligations and another node assume those ownership obligations prior to complete failure of the first node. In the alternative, an ownership change operation may be initiated by an administrator, e.g., via a request made on the clustering resource services of a node by a systems administrator interacting with the services through a higher level job. Moreover, an ownership change may be a primary corrective action, or may be backup corrective action, for example, if a cluster is unable to shift over resource management at a higher level. Moreover, rather than going through the clustering resource services, lower level routines within an operating system may be utilized to initiate an ownership change operation.

Figure 5:
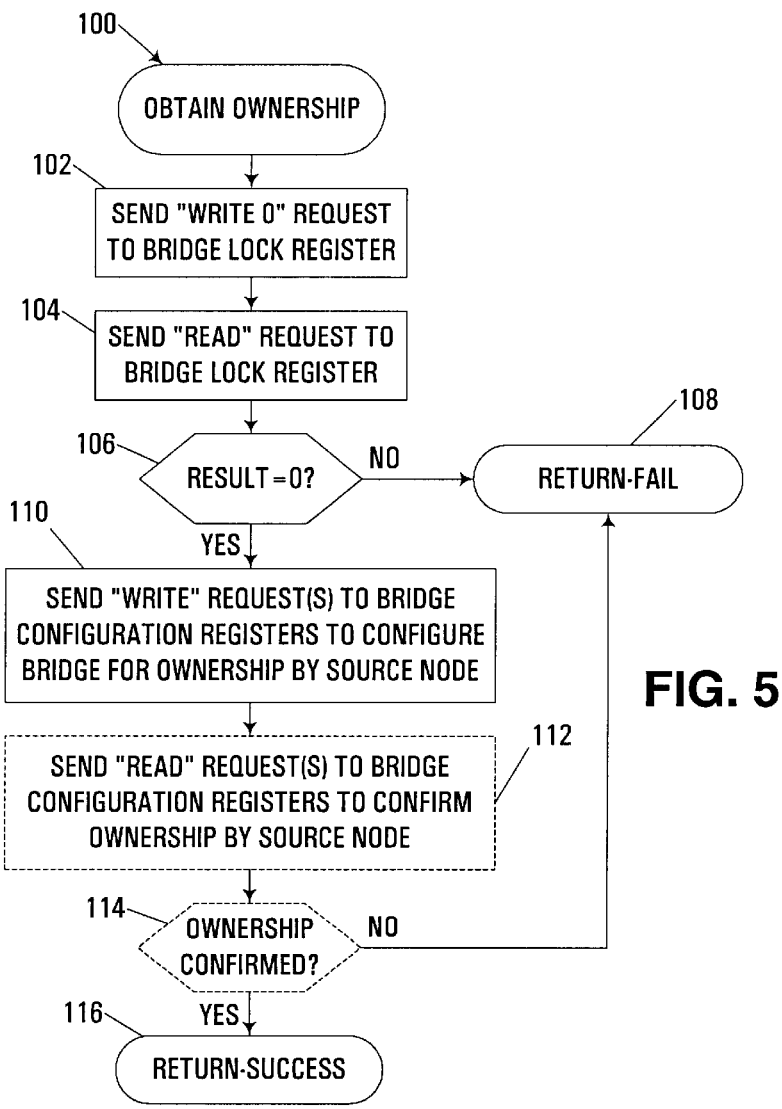
FIG. 5 is a flowchart illustrating the program flow of an obtain ownership routine initiated by a node in the clustered computer system of FIG. 1.

FIG. 5 illustrates, from the perspective of a node, the progress of an exemplary ownership change operation, represented by obtain ownership routine 100. Should a node desire to obtain ownership of a bridge device, whether due to a detected failure or a manually-activated event, routine 100 is called, and begins in block 102 by sending a "write 0" request to the lock indicator register for the bridge. Doing so results in a reset of the lock indicator as described above in connection with FIG. 3. Next, block 104 sends a read request to the bridge lock indicator register, thus attempting to obtain ownership of the bridge device. In response to the request, the bridge device processes the request as described above in connection with FIG. 2, and returns a result, which is queried at block 106. If the result is a value of "1", indicating that the bridge was locked as of the read request (e.g., due to another node issuing a read request prior to the node discussed herein), control passes to block 108, with a "fail" indication returned to a calling routine, indicating that the ownership change operation was not completed. If, however, the result to the read request is a "0", indicating that the bridge device was not locked as of receiving the read request, block 106 passes control to block 110 to send one or more write requests to the bridge configuration registers to configure one or more configuration parameters and thereby initialize the bridge device to be managed by the node.

Upon completion of block 110, block 112 may optionally be performed to send one or more read requests to the bridge configuration registers to confirm that they were in fact updated in response to the write requests. Such confirmation thereby confirms that ownership with the source node has been completed. As such, block 114 determines whether the ownership has been confirmed, and if so, passes control to block 116 to terminate the routine with a "success" result. Otherwise, block 114 passes control to block 108 to return a "fail" result and terminate routine 100. In the alternative, blocks 112 and 114 may be omitted, with the assumption made that any write requests made subsequent to a successful read request to the bridge lock register will complete the transfer of ownership to the local node.

Various modifications may be made to the illustrated embodiments without departing from the spirit and scope of the invention. For example, other forms of access requests may be utilized to perform the atomic operations disclosed herein. Moreover, various register combinations may be utilized to store the configuration information, in particular, the lock indicator, the owner identifier and the configuration parameters. For example, data associated with configuration parameters, owner identifiers and lock indicators may be stored in different bits within the same register, or spread across several registers. Given that the arrangement of such data within a register structure may vary widely, it should be appreciated that references herein to performing an access to a register to obtain one type of information, and performing another access to a register to obtain another type of information may constitute accesses to different registers or to different fields in the same register.

It should also be appreciated that additional gating may occur based upon ownership identification. For example, a bridge device may be restricted to receiving access requests directed to resources coupled to the bridge only from an owner node, whereby the owner identifier register may be utilized in connection with such access requests.

It should also be appreciated that, subsequent to routine 100, the controlling node may further require additional configuration of the bridge device, e.g., to establish cluster communication with resources on the device.

Other modifications will be apparent to one of ordinary skill in the art. Therefore, the invention lies in the claims hereinafter appended.

What is claimed is:

1. A method of processing access requests in an input/output (I/O) bridge device in a clustered computer system, the method comprising:
   (a) receiving from a first node in the clustered computer system, an access request directed to a lock indicator associated with the bridge device;
   (b) if the lock indicator is not set, locking the bridge device in response to the access request by setting the lock indicator and associating the bridge device with the first node; and
   (c) in response to a write request received from another node in the clustered computer system, restricting write access by the other node to at least one configuration parameter associated with the bridge device if the other node is not associated with the bridge device.

2. The method of claim 1, wherein the access request comprises a read request, the method further comprising, in response to the read request, returning an unlocked status to the first node if the lock indicator is not set, and returning a locked status to the first node if the lock indicator is set.

3. The method of claim 1, wherein associating the bridge device with the first node comprises storing an owner identifier associated with the first node in an owner identifier register associated with the bridge node.

4. The method of claim 1, further comprising resetting the lock indicator in response to a write request directed to the lock indicator by a node in the clustered computer system.

5. The method of claim 1, further comprising, updating the configuration parameter in response to a write request received from the first node when the bridge device is associated with the first node.

6. The method of claim 1, further comprising returning status information associated with the configuration parameter in response to a read request from any node in the clustered computer system regardless of whether such node is associated with the bridge device.

7. The method of claim 1, wherein the configuration parameter is selected from the group consisting of owner identification information, bridge address information, bridge register address mapping information, resource address mapping information, power management information and combinations thereof.

8. The method of claim 1, wherein setting the lock indicator and associating the bridge device with the first node are collectively performed as an atomic operation.

9. The method of claim 3, wherein the owner identifier includes a network address for the node that sent the access request to the bridge device and a port identifier associated with a port on the bridge device through which the access request was received.

10. A method of obtaining ownership of a input/output (I/O) bridge device in a clustered computer system, the method comprising:
    (a) in a first node in the clustered computer system, initiating an atomic operation on the bridge device that associates the bridge device with the first node and restricts another node in the clustered computer system from updating at least one configuration parameter register in the bridge device; and
    (b) thereafter, in the first node, configuring the bridge device to operate with the first node by initiating an update to the configuration parameter register in the bridge device.

11. The method of claim 10, wherein the atomic operation comprises a read operation directed to a lock indicator register associated with the bridge device.

12. The method of claim 10, wherein updating the configuration parameter register in the bridge device comprises updating a configuration parameter selected from the group consisting of owner identification information, bridge address information, bridge register address mapping information, resource address mapping information, power management information and combinations thereof.

13. The method of claim 11, wherein configuring the bridge device to operate with the first node is performed in response to receiving an unlocked status in response to the read operation.

14. The method of claim 11, further comprising resetting the lock indicator register prior to initiating the atomic operation by initiating a write operation on the lock indicator register.

15. An input/output (I/O) bridge device for use in a clustered computer system, the bridge device comprising:
(a) a lock indicator register that indicates whether the bridge device is locked;
(b) an owner identifier register that identifies a node from the clustered computer system that owns the bridge;
(c) a configuration parameter register that configures communications between the bridge and the clustered computer system; and
(d) an access control circuit configured to receive access requests directed to the lock indicator and configuration parameter registers, the access control circuit configured to process an access request directed to the lock indicator register by setting the lock indicator register and updating the owner identifier register to identify a source node associated with the access request if the lock indicator register is reset as of processing of the access request, and to process a write request directed to the configuration parameter register by updating the configuration parameter register if the owner identifier register identifies a source node associated with the write request directed to the configuration parameter register.

16. The bridge device of claim 15, wherein the access control circuit is further configured to process a second write request directed to the lock indicator register by resetting the lock indicator register.

17. The bridge device of claim 15, wherein the access request comprises a read request, wherein the access control circuit is further configured to process the read request by returning an unlocked or unlocked status based upon the status of the lock indicator register.

18. The bridge device of claim 15, wherein the access control circuit is configured to update the owner identifier register to identify a network address for the source node and a port identifier associated with a port on the bridge device through which the access request was received.

19. The bridge device of claim 15, wherein the access control circuit is further configured to return status information associated with the configuration parameter register in response to a read request from any node in the clustered computer system regardless of whether the owner identifier register identifies a source node associated with the read request.

20. The bridge device of claim 15, wherein the configuration parameter register stores a configuration parameter is selected from the group consisting of owner identification information, bridge address information, bridge register address mapping information, resource address mapping information, power management information and combinations thereof.

21. The bridge device of claim 16, wherein the access control circuit is further configured to reset the lock indicator register in response to the second write request regardless of whether the owner identifier register identifies a source node associated with the second write request.

22. A clustered computer system, comprising:
(a) a plurality of nodes; and
(b) an input/output (I/O) bridge device coupled to at least one node from the plurality of nodes, the bridge device including at least one configuration parameter register, and the bridge device configured to perform, in response to a first request from a first node among the plurality of nodes, an atomic operation that associates the bridge device with the first node and restricts another node among the plurality of nodes from updating the configuration parameter register, the bridge device further configured to thereafter update the configuration parameter register to configure the bridge device to communicate with the first node in response to a second request from the first node.

23. The clustered computer system of claim 22, wherein the bridge device comprises an input/output (I/O) expansion bus to Peripheral Component Interconnect (PCI) bus bridge device.

24. The clustered computer system of claim 22, wherein the atomic operation comprises a read operation directed to a lock indicator register associated with the bridge device.

25. The clustered computer system of claim 22, wherein the configuration parameter register in the bridge device stores a configuration parameter selected from the group consisting of owner identification information, bridge address information, bridge register address mapping information, resource address mapping information, power management information and combinations thereof.

26. The clustered computer system of claim 22, wherein the bridge device is configured to update the configuration parameter register to configure the bridge device to communicate with the first node only if the bridge device is associated with the first node when the second request is received by the bridge device from the first node.

27. The clustered computer system of claim 24, wherein the first node is configured to initiate the second request in response to receiving an unlocked status in response to the read operation.

28. The clustered computer system of claim 24, wherein the first node is configured to reset the lock indicator register prior to initiating the first request by initiating a write operation on the lock indicator register.

29. The clustered computer system of claim 28, wherein the bridge device is configured to process a write operation on the lock indicator register regardless of whether the bridge device is associated with a source of such write operation.

30. A program product, the program product comprising:
(a) a program configured to reside on a first node of a clustered computer system, the program configured to obtain ownership of an input/output (I/O) bridge device coupled to the first node by resetting a lock indicator for the bridge device, initiating an atomic operation that associates the bridge device with the first node and restricts another node in the clustered computer system from updating a configuration parameter register in the bridge device, and initiating an update of the configuration parameter register to configure the bridge device to communicate with the first node; and
(b) a signal bearing medium bearing the program.

31. The program product of claim 30, wherein the signal bearing medium includes at least one of a recordable medium and a transmission medium.

* * * * *